United States Patent [19]
Baker

[11] Patent Number: 6,145,273
[45] Date of Patent: Nov. 14, 2000

[54] APPARATUS FOR SEALING PERFORATED FLEXIBLE BAGS

[75] Inventor: Tony D. Baker, Hudson, Ohio

[73] Assignee: Advanced Poly-Packaging, Inc., Akron, Ohio

[21] Appl. No.: 09/304,175

[22] Filed: May 3, 1999

Related U.S. Application Data

[63] Continuation of application No. 08/878,019, Jun. 18, 1997, Pat. No. 5,918,441, which is a continuation-in-part of application No. 08/540,560, Oct. 6, 1995, Pat. No. 5,687,545.

[51] Int. Cl.[7] .................................................. B65B 61/20
[52] U.S. Cl. ...................... 53/284.7; 53/373.7; 53/375.9; 53/374.6
[58] Field of Search .................... 53/477, 373.7, 53/374.6, 375.9, 284.7, 389.2, 570, 384.1

[56] References Cited

U.S. PATENT DOCUMENTS

| 4,583,352 | 4/1986 | Heron | 53/284.7 |
| 4,664,161 | 5/1987 | Sawa et al. | 53/384.1 |
| 5,016,426 | 5/1991 | Davis | 53/373.7 |
| 5,056,295 | 10/1991 | Williams | 53/373.7 |
| 5,131,213 | 7/1992 | Shanklin et al. | 53/373.7 |
| 5,669,201 | 9/1997 | Simionato | 53/373.7 |

Primary Examiner—Eugene Kim
Attorney, Agent, or Firm—Renner, Kenner, Greive, Bobak, Taylor & Weber

[57] ABSTRACT

An apparatus is provided for filling and sealing flexible poly bags which are provided on a continuous roll. The apparatus has means for heat sealing filled bags. A drive mechanism conveys the bag into position for filling and sealing thereof. A clamp mechanism draws the bags into contact with the heat sealing means during the sealing process. A reverse actuation mechanism is provided for reversing the drive mechanism while the bag remains clamped so as to detach the bag at a perforation thereof. An interrupt means is also provided for disengaging the clamp mechanism when the clamp mechanism is interfered with by a foreign object. The interrupt means consists of an electrical circuit established through the clamp mechanism frame which circuit is broken when the clamp mechanism contacts a foreign object. Also provided is a guide mechanism for guiding the bags into engagement with the drive mechanism. The guide mechanism includes a pair of rollers which are in frictional contact with a table member, and a pair of belts are drivingly connected between the rollers and the drive means.

5 Claims, 6 Drawing Sheets

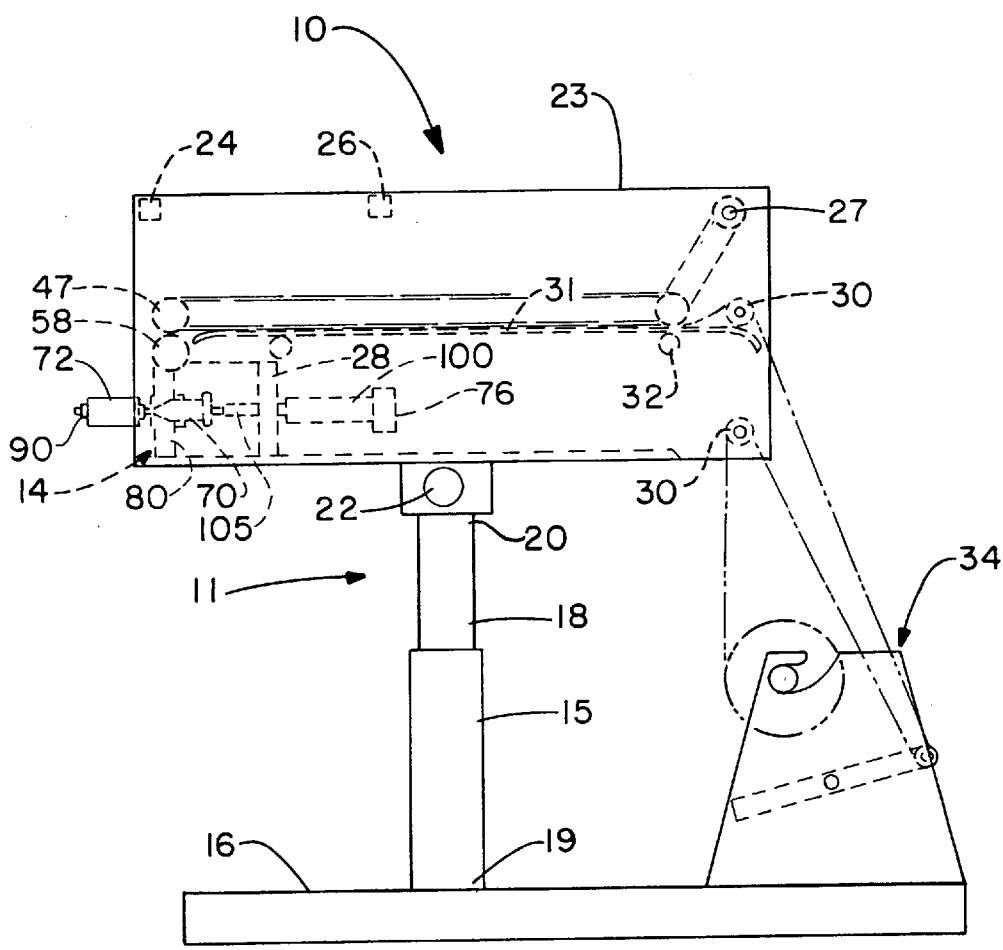
FIG.-3
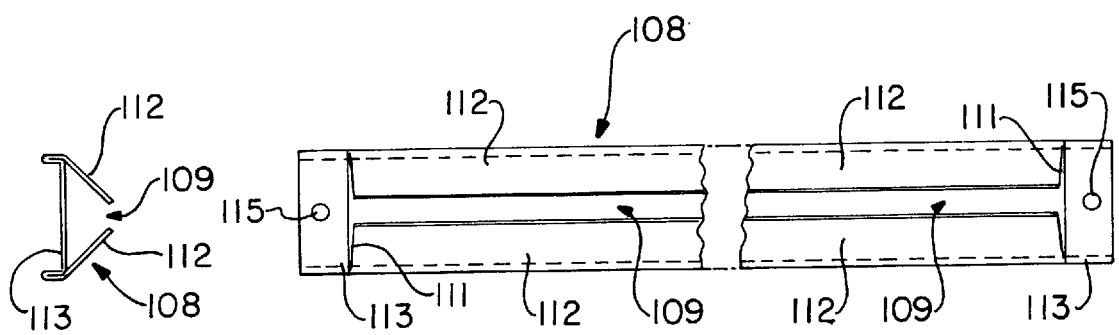
FIG.-8
FIG.-9

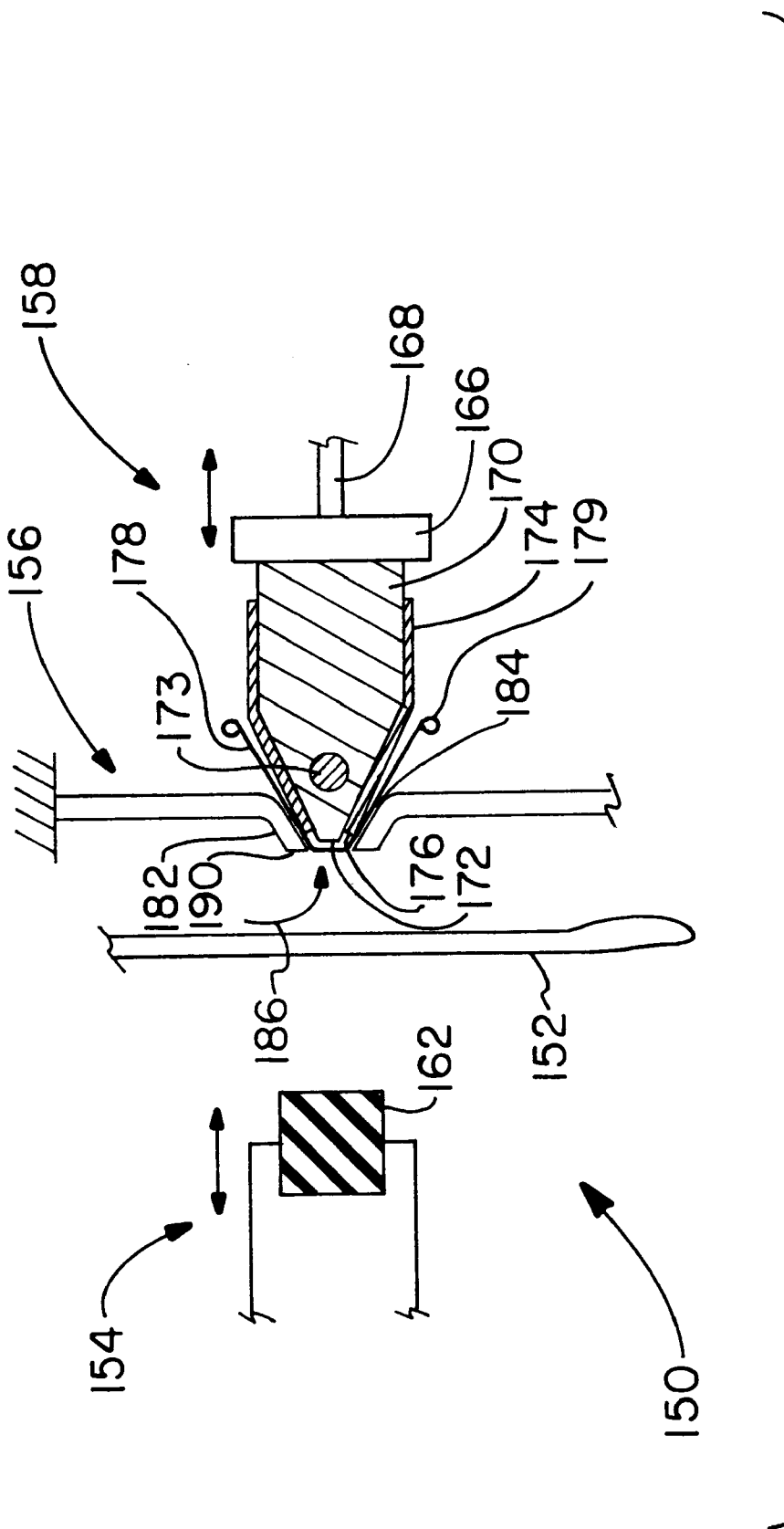

APPARATUS FOR SEALING PERFORATED FLEXIBLE BAGS

CROSS-REFERENCE TO RELATED APPLICATION

This application is a continuation of U.S. Ser. No. 08/878,019, filed on Jun. 18, 1997 now U.S. Pat. No. 5,918,441 which is a continuation-in-part of Ser. No. 08/540,560, filed Oct. 06, 1995 U.S. Pat. No. 5,687545, issued Nov. 18, 1997, which is incorporated herein by reference.

TECHNICAL FIELD

The invention herein resides in the art of packaging machinery. More particularly, the invention relates to machinery for filling and sealing perforated flexible poly bags provided on a continuous roll. Specifically, the invention relates to an apparatus for heat sealing and separating such bags after sealing.

BACKGROUND ART

It is well known that flexible poly bags are widely used in the packaging industry. It is further known to provide such bags on a continuous roll with individual bags being connected at a perforation. Accordingly, various machines and methods have been developed to rapidly open, fill, and seal such bags. Typically, bags are threaded through a series of rollers which are mechanically driven by an electric motor. The bags are passed beneath a continuous and/or pulsed air stream which serves to open the bag, at which time the bag may be filled either manually or automatically. The bag may then be sealed using either an adhesive or a heat sealing technique. Such heat sealing techniques typically involve the use of a heated seal bar which is briefly held in contact with the bag by a clamping mechanism. The heated seal bar is usually coated or covered with a non-stick material which is often provided in the form of a woven fabric. While these types of materials are highly effective in preventing the bag material from sticking to the seal bar, the extreme heat and frictional forces require that the material be frequently rotated or replaced.

Another disadvantage with known systems is that the mechanism for clamping the bag against the seal bar is subject to interference of objects which are accidentally interposed between the clamping mechanism and the seal bar. Such obstructions tend to damage the machine or otherwise jam the bag path. Accordingly, it has been known to provide interference sensors, in the form of optoelectronic devices which are often quite expensive.

It is further known to provide such machines with means for separating individual bags from one another at the perforation after sealing. Known systems for accomplishing this function have generally involved the use of a brake on the main drive roll to maintain the trailing edge of the bags in a fixed position while the bag to be detached remains clamped between the seal bar and the clamp mechanism. The clamp and seal mechanism is then moved away from the drive rolls, thereby causing the bag to separate from the roll at the perforation. This is typically accomplished by pivoting the clamp and seal bar mechanism relative to the rolls. The rather severe movement required produces a great deal of vibration and requires heavy duty hardware, increased maintenance and adjustment measures, and multiple actuation mechanisms. More recently it has been known to separate perforated bags by disengaging the drive roll from the drive motor, braking the roll, and then temporarily reversing the drive roll by way of a servo-drive or stepper motor while the bag to be sealed remains clamped at the seal bar.

Known sealing mechanisms employed in automated packaging devices provide a flat, spring-bias, plate with an aperture therethrough, wherein sharp serrated teethes surround the aperture. On one side of the flat plate aperture is a fixed heated seal bar. Disposed on the other side of the flat plate is a movable gripper bar. A plastic bag is received between the gripper bar and the spring-bias plate, whereupon the gripper bar engages the bag and the flat plate moves the bag into contact with the seal bar for sealing the plastic bag. After sealing, the bag is pulled in a known matter against the serrated teeth to remove the bag from its attached web. These known sealing mechanisms provide several disadvantages. One disadvantage is that the flat plate is costly to provide, especially with the serration needed to remove the bag from the web. It is known that the serrations wear and are expensive to replace. Moreover, the serrations tend to be very sharp and can be dangerous to the person using the packaging machine. Finally, the springs employed to bias the flat plate tend to wear which requires adjustment to the gripper bar to obtain the proper application of force during the sealing procedure.

Based on the foregoing, there is a need in the art for a sealing mechanism which is long lasting, safe to use and which provides a reliable seal that is here to forbid not unknown in the art.

Thus it is desired to obtain a packaging apparatus and method which will serve to overcome the foregoing disadvantages.

DISCLOSURE OF INVENTION

In light of the foregoing, it is a first aspect of the invention to provide a packaging apparatus for filling and sealing flexible poly bags.

Another aspect of the invention is the provision of an apparatus which allows for heat sealing of such bags.

Yet a further aspect of the invention is the provision of a means for detaching individual bags after filling and sealing thereof.

Still a further aspect of the invention is the provision of a means for automatically feeding and/or threading the bags into the machine.

Yet another aspect of the invention is the provision of a means for disabling the clamp bar mechanism when the same is interfered with by a foreign object.

A further aspect of the invention is the provision of such an apparatus which is inexpensive to manufacture and maintain and also easy to use.

Still another aspect of the invention is the provision of a sealing mechanism which is safe to use and provides a reliable seal.

Still another aspect of the present invention, as set forth above, is the provision of a sealing mechanism in which a fixed gripper plate is disposed between a movable clamp bar and a movable seal bar, wherein the fixed gripper plate has opposed angularly directed flanges for receiving the seal bar and allowing the seal bar to contact a plastic bag disposed between the gripper plate and a clamp bar. The foregoing and other aspects of the invention which will become apparent as the detailed description proceeds, are achieved by a sealing mechanism used in packaging machines, comprising: a clamp bar; a seal bar; and a gripper plate interposed between the clamp bar and the seal bar, the gripper plate have angularly directed opposed flanges which form an opening for receiving one of the clamp bar and the seal bar, wherein a bag is received between the clamp bar, the gripper plate, and the seal bar and sealed at the opening.

Other aspects of the invention are obtained by a combination of a sealing mechanism and a heat shield for sealing plastic bags comprising: a sealing mechanism having a seal bar which has a V-shaped section that is movable toward a gripper plate and a clamp bar which captures a plastic bag therebetween, the gripper plate having a slot therethrough for receiving the V-shaped section, the seal bar sealing the plastic when in contact therewith; and a heat shield having an opening therethrough wherein the heat shield conforms to the shape of the V-shaped, the opening allowing a portion of the V-shaped section to extend into the slot.

Further aspects of the invention are attained by a sealing mechanism carried by automated packaging machine which feeds a continuous supply of plastic bags to the sealing mechanism whereupon after a individual is filled a sealing mechanism seals the individual bag, comprising: a movable clamp bar; a movable seal bar which has a V-shaped profile that ends in a tip; and a gripper plate interposed between the movable clamp and the movable seal bar, the gripper plate having a recess that extends into a pair of opposed angular flanges that form an opening. The recessed receiving the V-shaped profile and the tip extending into the opening to contact and seal a bag when the movable clamp bar and the movable seal bar close upon the gripper plate.

BRIEF DESCRIPTION OF THE DRAWINGS

For a complete understanding of the objects, techniques, and structure of the invention, reference should be made to the following detailed description and accompanying drawings wherein:

FIG. 3 is an elevational side view of the support frame of the apparatus;

FIG. 8 is an elevational side view of the heat shield according to the invention;

FIG. 9 is a front elevational view of the heat shield of FIG. 8; and

FIG. 10 is a side schematic view of an alternative heat sealing mechanism.

BEST MODE FOR CARRYING OUT THE INVENTION

Figure 1:
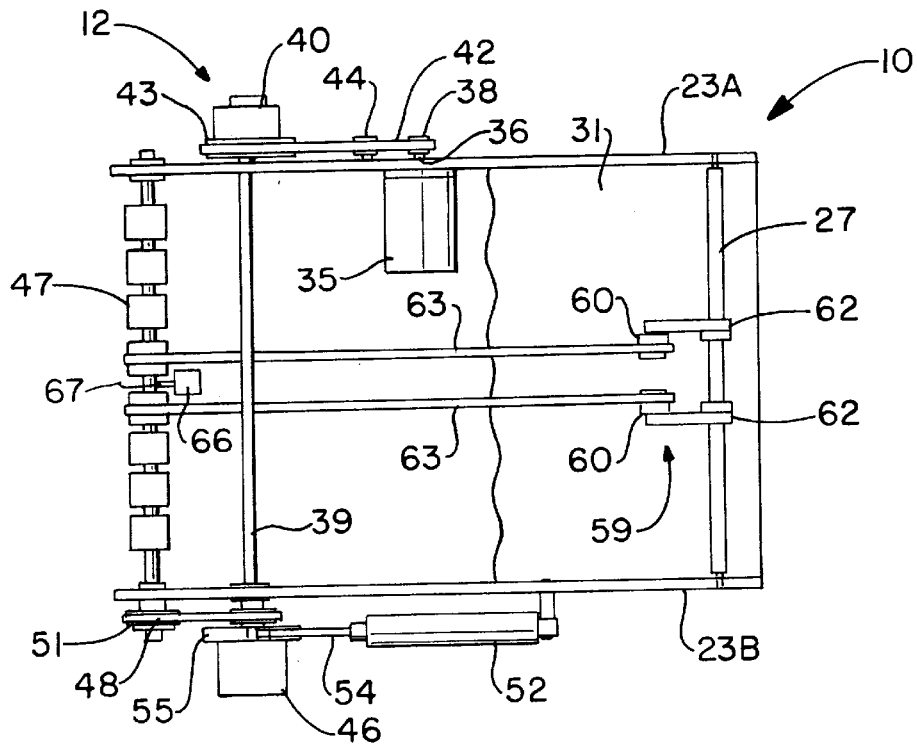
FIG. 1 is a top plan view of an apparatus according to the invention.
Figure 2:
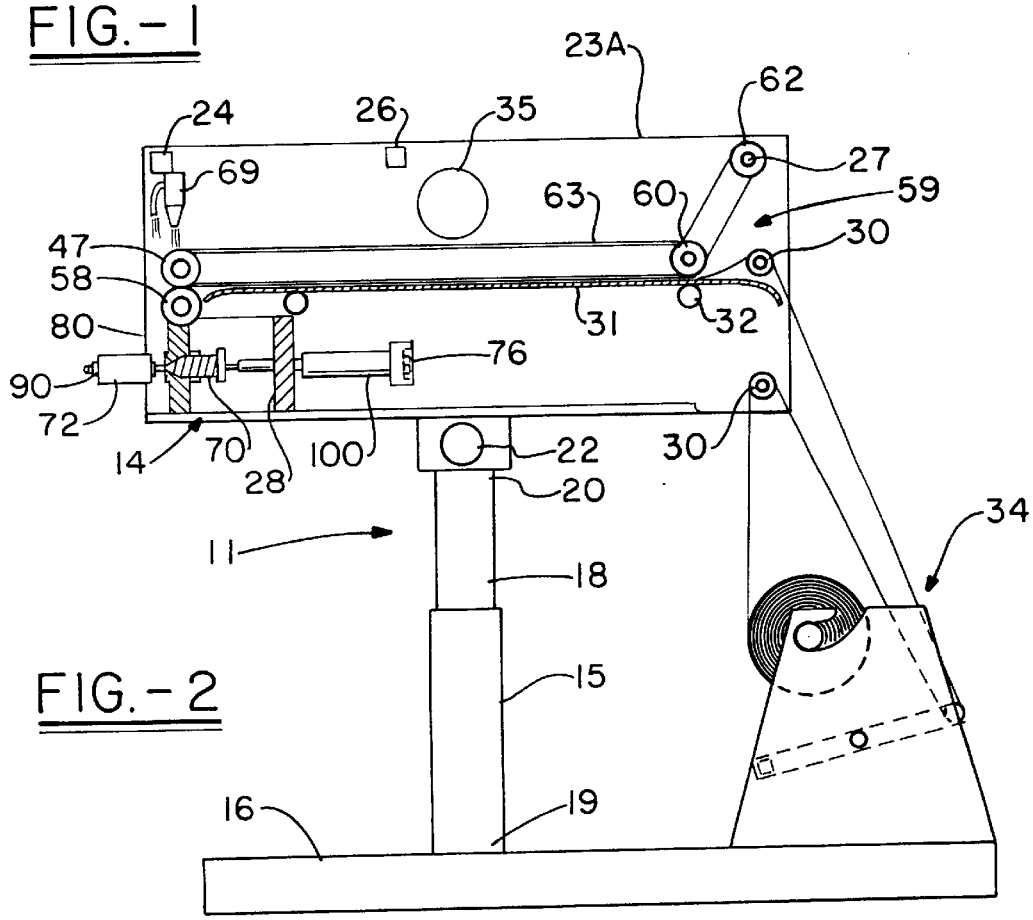
FIG. 2 is a cross sectional side view of the apparatus.

Referring now the drawings and more particularly to FIGS. 1–3, it can be seen that a packaging device according to the invention is designated generally by the numeral 10. As can be seen, the device 10 is comprised generally of a support frame 11, a drive mechanism 12, and a sealing mechanism 14.

The support frame 11 includes a support stand 15 having a base portion 16 and an upright 18. As shown, the upright 18 has a first end 19 which is affixed to the base portion 16 and a second end 20 from which extends a lateral support bar 22. A pair of generally rectangular side plates 23 are mounted to the lateral support bar 22 in a laterally spaced relationship. These side plates 23 are further affixed to one another by way of a front cross bar 24, and an intermediate cross bar 26. In addition to the cross bars 24 and 26 the side plates 23 are further connected by a cylinder support bar 28 and a pair of free rollers 27 and 30 which are journaled in the side panels 23 at the rear of the device. A table member 31 is removably fitted between the side plates 23 and rests on a plurality of table support rods 32. As shown, the support frame 11 is also provided with a reel support/tensioner assembly 34 which is mounted to the base portion 16 of the support frame 11.

Figure 4:
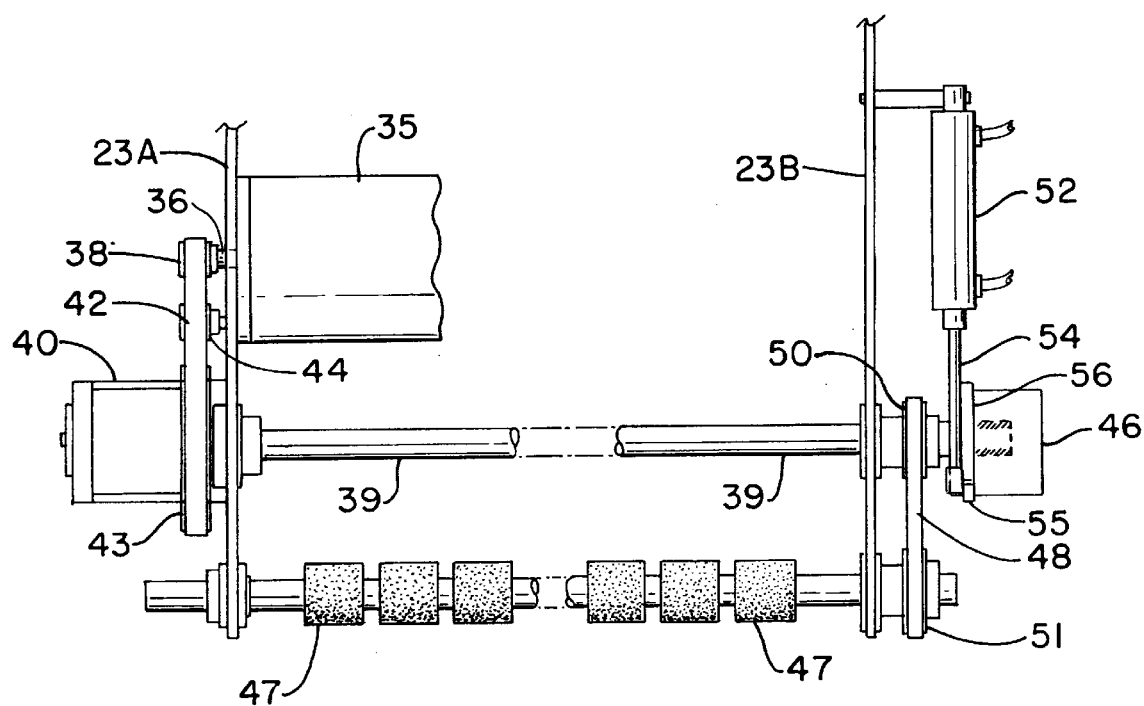
FIG. 4 is an enlarged top view of a portion of the apparatus of FIG. 1.
Figure 5:
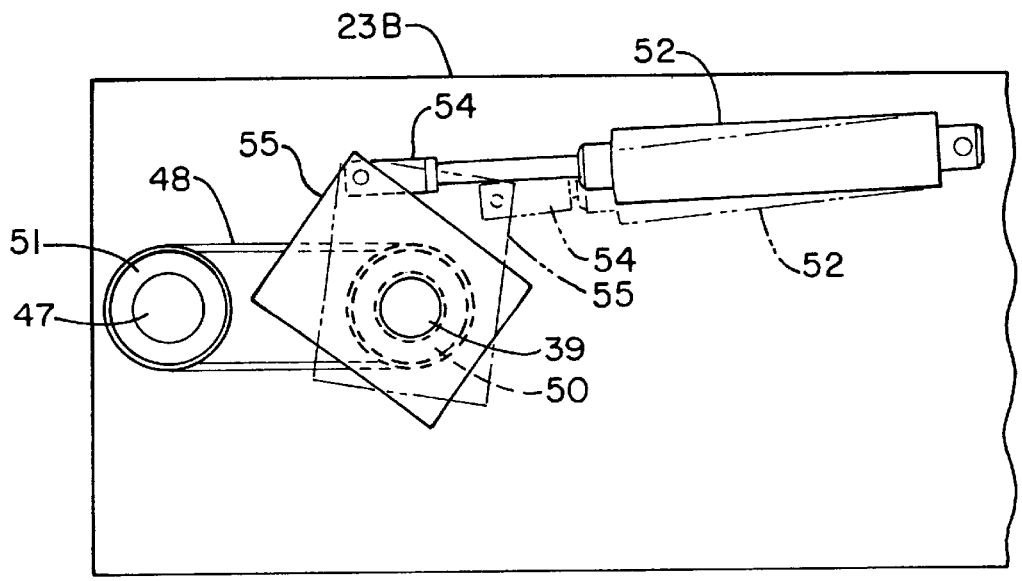
FIG. 5 is an elevational side view of the apparatus of FIG. 1.

With reference now to FIG. 1, it can be seen that the drive mechanism 12 includes a drive motor 35 which is mounted on the inside of the side plate 23A such that the motor shaft 36 extends through an aperture in the side plate. A timing pulley 38 is rigidly affixed to the end of shaft 36. A drive shaft 39 is journaled in the side plates 23 and extends through the side plate 23A to engage an electric clutch assembly 40 which is mounted on the outside of plate 23A. As can be seen, the electric clutch assembly 40 is drivingly engaged to the drive motor 35 by way of a timing belt 42 which engages the timing pulley 38 affixed to the motor shaft 36 and a second timing pulley 43 affixed to the clutch assembly 40. An adjustable belt tensioner 44 is provided between the first timing pulley 38 and the second timing pulley 43 to maintain the desired tension on the belt 42. The other end of drive shaft 39 is journaled in the side plate 23B and extends therethrough to engage an electric brake assembly 46. As is perhaps best shown in FIG. 4, drive shaft 39 drivingly engages a rubber roller 47 by way of a second timing belt 48. As shown, second timing belt 48 engages drive shaft 39 by way of timing pulley 50, and similarly engages roller 47 by way of timing pulley 51. It can also be seen that a pneumatic cylinder 52 is affixed to the side plate 23B with its push rod 54 linked to the electric brake assembly 46 by way of an actuating plate 55. Actuating plate 55 is a generally rectangular plate member which is rigidly affixed to the front plate 56 of the electric brake assembly 46.

It should now be recognized that motor 35 serves to drive the shaft 39 when clutch 40 is engaged. Accordingly, shaft 39 drives rubber roller 47 which is in frictional contact with a roller 58 which may be made of aluminum. Accordingly, the frictional engagement of the rubber roll 47 to the roller 58 allows bags to be fed between the respective rolls 47 and 58 so as to index the bags forwardly therethrough. Those skilled in the art should also recognize that the combination of the clutch 40, electric brake 46, and pneumatic cylinder 52 allows the rubber roll 47 to be disengaged from the drive motor 35 and partially rotated opposite the direction of drive rotation. This is accomplished by disengaging the drive belt 42 by disengaging the electric clutch 40. At the same time, the electric brake 46 is applied to lock the shaft 39 to the brake 46 and actuating plate 55. Thus, when the pneumatic cylinder 52 is actuated the drive shaft 39 is rotated in a direction opposite to the forward drive direction.

A feed drive assembly 59 is also provided to allow for automatic threading of the device 10. The feed drive 59 is comprised of a pair of guide rollers 60 which are mounted to the free roller 27 by way of roller guide blocks 62. A pair of guide belts 63 engage the guide rollers 60 and are further drivingly connected to the rubber roller 47. Accordingly, the drive belts 63 are maintained in frictional engagement with the table 31 due to spring tension applied to the roller guide blocks 62. Thus, bags may be fed between belts 63 and table 31 at the rear of the device 10 and conveyed forwardly to the rubber roller 47 and the roller 58.

The apparatus also includes a perforation sensing device 66 preferably in the form of an electrical contact element 67 which is grounded to the roller 58. As such, bags are fed between the electrical contact element 67 of the perforation sensor 66 and the aluminum roll 58 such that the electrical contact element 67 is insulated from the roller 58. When a perforation passes beneath the contact element 67 and the roller 58, the contact element 67 is momentarily grounded to the roller 58 thereby establishing a closed circuit which sends a signal to a control logic unit (not shown). Those skilled in the art will recognize that the device 10 may also be provided with a bag opening means 69 preferably in the form of a continuous or impulsive air stream. Accordingly, as bags are passed beneath the air stream they are momentarily opened by inflation at which time they may be filled either manually or automatically.

Figure 6:
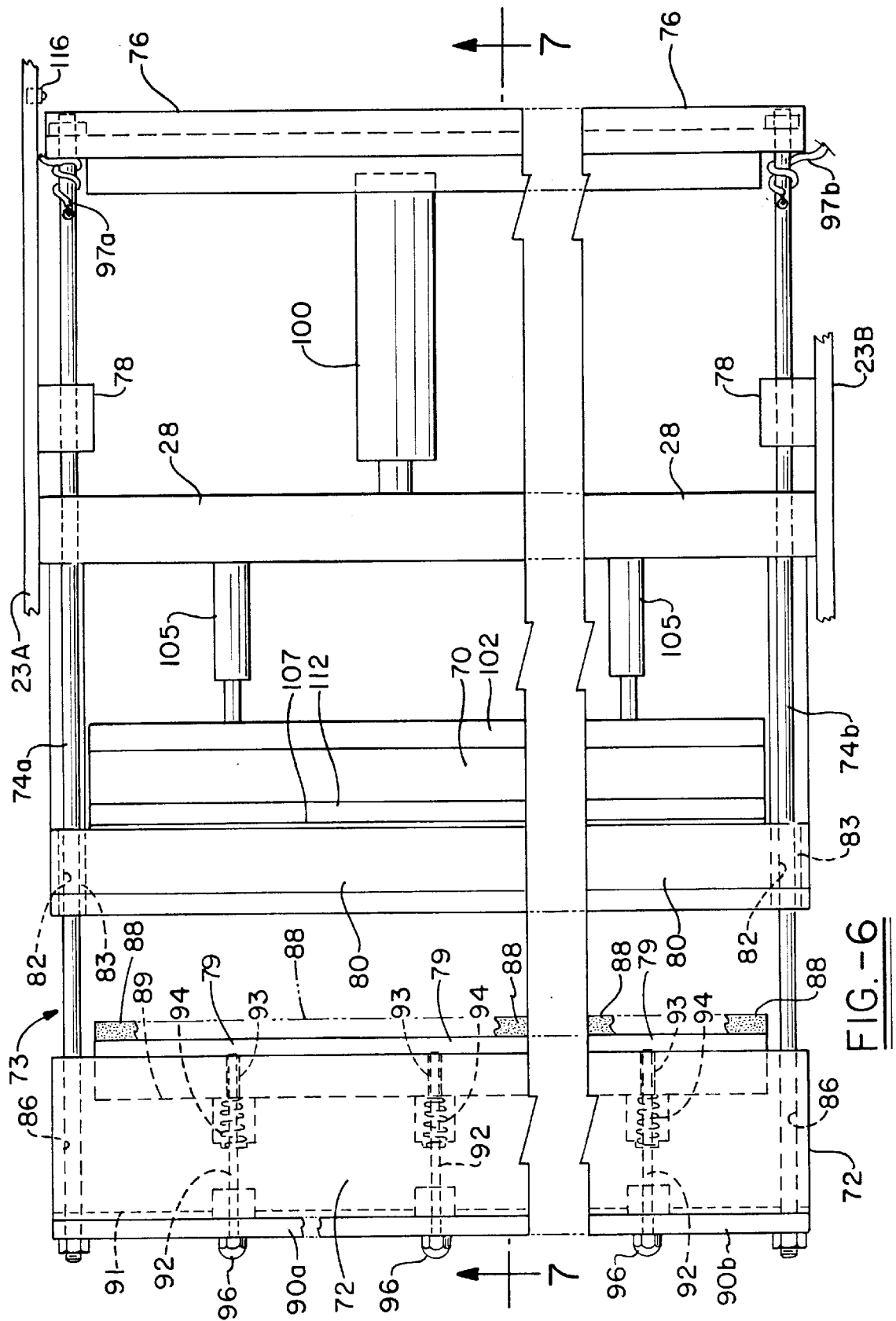
FIG. 6 is a top plan view of the clamping mechanism according to the present invention.
Figure 7:
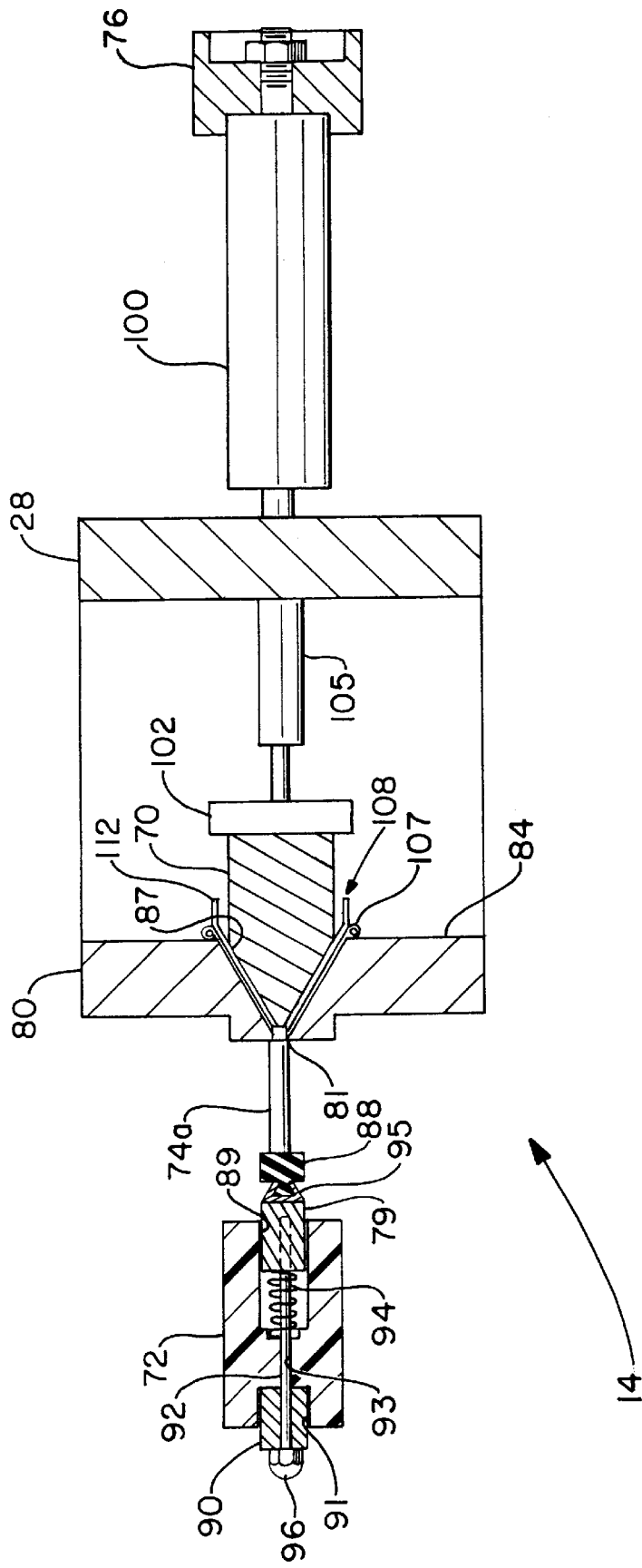
FIG. 7 is a cross sectional view of the mechanism of FIG. 6 taken along the line 7—7.

With reference now to FIGS. 6–7, it can be seen that the seal mechanism 14 is comprised of a seal bar 70 and a clamp bar 72. The clamp bar 72 is mounted on a clamp bar frame 73 comprising a pair of elongated cylindrical rods 74 which are laterally spaced from one another and affixed at one end to a rear frame member 76 and at the other end to clamp bar 72. The rods 74 pass through a pair of nylon mounting blocks 78 which are affixed to the side plates 23, and also pass through a gripper plate 80 mounted on the front of the device 10 as shown. The gripper plate 80 is of a generally rectangular shape having an elongated slot aperture 81 therein and a pair of rod guide apertures 82. For reasons which will become apparent as the description continues, the rod guide apertures 82 are lined with a nylon bushing 83 which acts as an electrical insulating bearing for the rods 74. The slotted aperture 81 opens to a V-shaped recess 87 in the rear face 84 of the gripper plate 80. The clamp bar 72 is preferably manufactured from a suitable nylon or other non-conductive material. The bar 72 includes a rod mounting aperture provided proximal to each end of the clamp bar 72. The clamp bar 72 also includes a bar 79 with an attached pressure pad 88 which is fitted into a first notched recess 89 in one side of the clamp bar 72. In the preferred embodiment, the pressure pad 88 is made of rubber or other like resilient material. A pad holder 95 may be fastened to the bar 79 for receiving the pad 88. A plurality of contact strips 90 are received in a second notched recess 91 opposite the first notched recess 89. For reasons which will become apparent, it is preferable that there be at least two contact strips 90 mounted to the bar 72. The contact strips 90 are mounted to the bar 72 by way of screws 92 which pass through apertures 93 in the clamp bar 72 to engage the pressure pad 88. It should be noted that a pair of coil springs 94 are located on the screw 92 between the pressure pad 88 and the contact strips 90. Screws 92 are affixed to the contact strips 90 by way of acorn nuts 96. Accordingly, the spring bias pressure on the pressure pad 88 maintains the acorn nuts 96 in contact with the contact strips 90. However, when pressure is exerted against the pressure pad 88 the springs 94 are compressed and contact between the acorn nuts 96 and the contact strips 90 is broken. It is also important to note that the contact strips 90 are affixed to the rods 74 through the rod mounting apertures 86. An electrical current is provided through the clamp bar frame 73 by way of wires 97A and 97B which are connected to the rods 74A and 74B respectively. With wire 97A connected to a positive potential and wire 97B connected to a negative potential, an electrical circuit is established through the bar frame 73 by way of rods 74 and contact strips 90. As can be seen, the circuit between contact strips 90A and 90B is established through the pressure pad 88 when the pressure pad 88 is in the spring biased position. However, when a force is exerted against the pressure pad 88, contact is broken, resulting in an incomplete circuit. Thus it should be apparent that the rear frame member 76 must be made of a non-conducting material or alternatively the rods 74 must be insulated from the rear frame member 76 by way of nylon bushings, so as to prevent a short circuit between wires 97.

Clamp bar assembly 72 is actuated by way of a pneumatic cylinder 100 which is rigidly affixed to the support frame 11 by a mounting bar 28 and is also affixed to the rear frame member 76 of the clamp bar frame 73. Accordingly, when the pneumatic cylinder 100 is actuated the clamp bar frame 73 is selectively translated toward or away from the fixed gripper plate 80.

Seal bar 70 is mounted on a seal bar mounting plate 102 directly behind gripper plate 80 such that the leading edge 103 of seal bar 70 partially extends into the V-shaped recess 87 of plate 80. Accordingly, it is preferred that the leading edge 103 of seal bar 70 have a V-shaped tapered profile. Seal bar mounting plate 102 is mounted on a pair of pneumatic cylinders 105 which are in turn affixed to the mounting bar 28 opposite pneumatic cylinder 100. As such, when pneumatic cylinders 105 are actuated the seal bar mounting plate 102 and seal bar 70 are translated forward so as to protrude deeper into the recess 87 of gripper plate 80. The V-shaped leading edge of seal bar 70 extends slightly through slot aperture 81 at this point. Seal bar 70 is heated by passing an electric current through the bar. A non-stick material 107 is interposed between the seal bar 70 and the gripper plate 80 so as to prevent the seal bar 70 from sticking to bags during the sealing process.

Turning now to FIGS. 8 and 9, a novel aspect of the invention is the provision of an insulating shield 108 which is adapted to be interposed between the seal bar 70 and the non-stick material 107. The shield 108 is comprised of a thin strip of a resilient metal or other appropriate heat resistant material. The strip of material is of a generally rectangular shape and includes a slot 109 longitudinally therein. A pair of vertical slots 111 are also provided in the shield 108 so as to form tabs 112. As can be seen, the tabs 112 are bent slightly outwardly to form a V-shaped profile which compliments that of the gripper plate recess 87. Shield 108 is also provided with a pair of mounting tabs 113 at each end thereof, which include fastener apertures 115 for affixing the shield 108 to the gripper plate 80. As can be seen when the shield 108 is mounted to the gripper plate 80 the tabs 112 extend into the V-shaped recess 87 so as to allow only the leading edge 103 of the seal bar 70 to contact the non-stick material 107. Thus, only a small portion of the non-stick material 107 is subjected to the heat and frictional wear of the sealing process. Further, the shield 108 serves to prevent the non-stick material 107 from contacting the seal bar 70 at all times except during sealing.

As is perhaps best shown in FIG. 2, the gripper plate 80 with the clamp bar assembly 73 mounted therein, as well as the seal bar 70 are mounted directly below the aluminum roller 58. Thus, in operation, bags are fed from the reel support and tensioner assembly 34, mounted on the base 16 of the support frame 11, over the free roller 30 and into the feed drive assembly 59. Accordingly, the guide belts 63 guide the bags over the table 31 and into engagement with the rollers 47 and 58. As the bags pass over the aluminum roller 58, the perforation sensor 66 sends a signal to the control logic system so as to indicate the position of the individual bags. Simultaneously, the individual bag to be filled is opened by the air system 69. Also at this time the electric clutch assembly 40 is actuated to disengage the rubber roll 47 from the motor drive 35, and the electric brake assembly 46 is actuated to stop rotation of the rubber roll 47. Thus movement of the bags through the machine 10 is halted so that the bag may be filled either manually or automatically. After the bag is filled, pneumatic cylinder 100 is actuated so as to translate the clamp bar assembly 72 toward the gripper plate 80. Simultaneously, the pneumatic cylinders 105 are actuated to bring the seal bar 70 into contact with the gripper plate recess 87. Thus, the bag is clampingly held between the clamp bar 72 and the gripper plate 80 while the heat from the seal bar 70 seals it. While the bag remains clamped between the gripper plate 80 and clamp bar 72, the pneumatic cylinder 52 is actuated so as to rotate the rubber roll 47 in a direction opposite that of drive rotation. Accordingly, the filled and sealed bag is detached from the bag roll due to its inability to move rearwardly with the rest of the bags. After the filled bag has been detached the clamp bar 72 is translated forward by the pneumatic cylinder 100 and the bag falls onto a conveyor or into a collection bin and the control logic system disengages the brake 46 and the clutch 40 to allow the drive motor 35 to index the next bag into position so that the process can begin anew.

During the above described process, if an object is interposed between the clamp bar 72 and the gripper plate 80, the pressure exerted against the pressure pad 88 will cause the acorn nuts 96 to disengage from the contact strips 90 thereby breaking the circuit established by the clamp bar frame 73, the broken circuit serves to notify control logic of the interference and thus further actuation of the clamp bar assembly 72 by way of the pneumatic cylinder 100 is halted. To prevent the actuation of the clamp bar assembly 72 from being halted when the pressure pad 88 contacts the gripper plate 80 just prior to sealing, the device 10 is provided with a magnetic proximity switch 116. Switch 116 is located on the support frame 11 at a location such that the switch 116 will only be actuated when the pressure pad 88 is in imminent contact with the gripper plate 80. As such, the actuation of the switch 116 is used to establish an alternate current path when the clamp bar circuit is broken, so as to prevent halting of clamp bar actuation.

Referring now to FIG. 10, it can be seen that an alternative sealing mechanism according to the invention is designated generally by the numeral 150. It will be appreciated that the sealing mechanism 150 may be employed with the packaging device 10 previously described. Similar to the previous embodiment, a polybag 152, which may be a single plastic bag or a plastic bag provided on a continuous roll, is received by the sealing mechanism 150; an article is placed in the bag; and the sealing mechanism is closed to seal and enclose the article. The sealing mechanism 150 includes a movable clamp bar 154, a fixed gripper plate 156 and a movable seal bar 158. Generally, the bag 152 is received between the clamp bar 154 and the gripper plate 156, whereupon the clamp bar 154 and the seal bar 158 are moved inwardly toward the gripper plate 156 and the bag 152 to effect a seal thereof. As in the first embodiment, the clamp bar 154 includes a pressure pad 162 which may be made of rubber or like material.

The seal bar 158 includes a mounting plate 166 which is translated by a piston 168. Securably mounted to the mounting plate 166 is a V-shaped section 170 which has a tapered profile that ends in a tip 172. A heat element 173 is carried by the V-shaped section 170. A heat shield 174 is disposed on the V-shaped section 170 and conforms to the shape thereof. The heat shield 174 has a slot 176 through which the tip 172 extends. A non-stick material 178 may be disposed over the heat shield 174 and the tip 172 is in juxtaposition to the gripper plate 156. Elongated rods 179 may be provided along the top and bottom lengths of the non-stick material to provide structural stability thereto.

The gripper plate 156 includes a pair of opposed, angularly directed flanges 182 which form a V-shaped recess 184 that is slightly larger than the V-shaped section 170. The V-shaped recess 184 forms an opening 186 between the flanges 182 for receiving the seal bar 158 when it is translated to a position in contact therewith. In other words, the V-shaped recess 184 of the flanges 182 provides a substantially conforming bearing surface for the seal bar 158 whenever a bag 152 is to be sealed. Of course, the non-stick material 178 bears against the gripper plate 156 when it is placed adjacent the V-shaped recess 184 during the sealing process. Each of the flanges 182 provides an edge 190 upon which the bag 152 bears when the pressure pad 162 closes upon the gripper plate 156. As those skilled in the art will appreciate, the clamp bar 154 and the seal bar 158 are moved toward the gripper plate 156 at approximately the same time. With the seal bar 158 received within the V-shaped recess 184, a flat surface is provided by the edges 190 and the tip 172 upon which the bag 152 is positioned against by the pressure pad 162. Shortly after the closure of the clamp bar 154 and the seal bar 158, the heating element 173 contained within the seal bar 158 is activated and the two layers of the bag 152 are sealed to one another to enclose the contents therein. Upon withdrawal of the seal bar 158, the non-stick material 178 easily releases from the sealed bag 152 and the gripper plate 156. It will be appreciated that the heat shield 174 protects the V-shaped section 170 during insertion thereof into the V-shaped recess 184. The heat shield 174 also directs heat from the heating element 173 toward the tip 172. By directing the heat in this manner, the wear on the flanges 182 and on the pressure pad 162 is greatly reduced.

As should be apparent from the above description, the sealing mechanism 150 provides numerous advantages over the presently known art. The structure presented above provides a defined seal area which eliminates the need for sharp serrated teeth that are usually provided on known gripper plates. The present embodiment is also advantageous by virtue of the heat shield 174 directing the heat in the seal bar 158 toward the tip thereof which is then applied to seal the bag 152.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the invention, reference should be made to the following claims.

What is claimed is:

1. A packaging device, comprising:
   a support frame;
   a drive mechanism carried by said support frame for transferring a web of open bags from a storage position to a loading position;
   a sealing mechanism carried by said support frame, wherein articles are placed into one of the open bags at said loading position, said sealing mechanism providing a clamp bar opposed by a gripper plate which when spaced apart receives the open bag and when closed clamps, seals and removes the bag from the web of bags;

an interrupt mechanism coupled to said sealing mechanism, wherein insertion of an object between said clamp bar and said gripper plate during closure thereof halts the closing and sealing process;

a rear frame;

a pair of spaced apart electrically conductive rods extending from said rear frame, said gripper plate electrically isolated from and slidably mounted on said rods, said clamp bar mounted to said rods opposite said rear frame;

a pressure pad carried by said clamp bar, wherein actuation of said sealing mechanism forces closure of said gripper plate on said pressure pad;

a pair of spaced apart contact strips carried by said clamp bar and electrically connected to said rods; and a spring-biased screw slidably engaging each said contact strip at one end and fixed to said pressure pad at an opposite end, wherein insertion of an object between said pressure pad and said gripper during closure thereof causes disengagement of said screw from said contact strip to interrupt a circuit formed by said rods, said contact strips and said gripper pad, which in turn stops closure of said gripper plate.

2. The packaging device according to claim 1, further comprising:

a seal bar carried by said rods and electrically isolated therefrom, said seal bar carrying said gripper plate.

3. The packaging device according to claim 1, further comprising:

a proximity switch carried by said support frame and actuated when said pressure pad is in imminent contact with said gripper plate to preclude stoppage of the sealing cycle.

4. The packaging device according to claim 1, further comprising:

a perforation sensing device coupled to said drive mechanism, said drive mechanism including an aluminum roller wherein the web of bags is passed between said aluminum roller and said sensing device, wherein passage of a perforation in the web of bags generates a signal to control operation of said drive mechanism.

5. A bag sealing safety device comprising:

a non-conductive clamp bar member;

an electrically conductive pressure pad member mounted in said clamp bar member;

at least two electrically conductive contact strips mounted in said clamp bar member;

at least two rod members mounted in said clamp bar member, one of said at least two rod members electrically connected to one of said at least two contact strips and the other of said at least two rod members electrically connected to the other of said at least two contact strips;

fastener means for selectively biasing said pressure pad member to establish an electrical connection with said at least two contact strips;

a positive electrical potential connected to said one of said at lest two rod members; and a negative electrical potential connected to the other of said at least two rod members;

whereby an electrical circuit is established between said positive potential and said negative potential when said fastener means biases said pressure pad member into electrical connection with said contact strips and said circuit is interrupted when said pressure pad is not biased into electrical connection with said contact strips.

* * * * *